United States Patent [19]

Yamaguchi et al.

[11] Patent Number: 4,971,258
[45] Date of Patent: Nov. 20, 1990

[54] METHOD OF MAKING HIGH-PURITY FINE PARTICLES OF REACTIVE METALS AND MANUFACTURING VESSEL THEREFOR

[75] Inventors: Toru Yamaguchi, Sakura; Yukio Inazuki, Sayama; Hideo Nakazawa, Funabashi, all of Japan

[73] Assignees: IHI Master Metal Ltd.; Ishikawajima Harima Heavy Industries Co., Ltd., both of Tokyo, Japan

[21] Appl. No.: 378,531

[22] Filed: Jul. 11, 1989

[30] Foreign Application Priority Data

Aug. 26, 1988 [JP]  Japan .................................. 63-210620
Sep. 2, 1988 [JP]  Japan .................................. 63-218486

[51] Int. Cl.$^5$ ....................... B02C 19/12; B02C 23/18
[52] U.S. Cl. ........................................ 241/17; 241/23; 241/DIG. 14
[58] Field of Search ...................... 241/18, 22, 23, 17, 241/DIG. 14; 62/55.5, 121; 252/181.4

[56] References Cited

U.S. PATENT DOCUMENTS

1,793,098  2/1931  Kramer ....................... 241/DIG. 14
4,755,201  7/1988  Eschwey et al. ................. 62/55.5 X

FOREIGN PATENT DOCUMENTS

131695  7/1984  Japan .......................... 241/DIG. 14
2169622  7/1986  United Kingdom ........ 241/DIG. 14

OTHER PUBLICATIONS

"Inorganic and Theoretical Chemistry", Mellor, vol. II, Sep. 1946, p. 469.

Primary Examiner—Joseph M. Gorski
Attorney, Agent, or Firm—Dykema Gossett

[57] ABSTRACT

A method of making high-purity fine particles of reactive metals, reactive especially in terms of their inclination to form hydroxides, comprises the steps of: preparing an inert gas atmosphere within which to manufacture the particles; reducing the moisture remaining in the inert gas atmosphere to an extremely low level; pulverizing the reactive metal within the moisture-free inert gas atmosphere; and collecting and sealing the product particles of reactive metal in a storage container in the same moisture-free inert gas atmosphere. The vessel for containing the inert gas atmosphere comprises: a hermetically sealable vessel capable of maintaining the inert gas atmosphere; a pair of rubber gloves for carrying out manual operations in the vessel under the inert gas atmosphere; a cryogenic cooling device attached to one wall of the vessel for condensing away the moisture remaining in the inert gas atmosphere into dew droplets; and an accumulator for equalizing the inner pressure of the vessel with the ambient atmospheric pressure.

25 Claims, 6 Drawing Sheets

Evacuation

Inert gas

FIG.10B

1 — Vessel for Manufacturing High Purity Fine Particles of Reactive Metals

29 — Cryogenic Dew Condenser

107 — Method of Trapping Moisture Away by Forming Hydroxide

108 — Na Vapor Generator

110 — Method of Detecting Moisture Remaining in a Trace Amount

112 — Trace Moisture Indicator

114 — Method of Roughly Pulverizing Hf Crystal Bars and Apparatus Therefor

METHOD OF MAKING HIGH-PURITY FINE PARTICLES OF REACTIVE METALS AND MANUFACTURING VESSEL THEREFOR

BACKGROUND OF THE INVENTION

1. Technical Field

The present invention generally relates to a method of making high-purity fine particles of reactive metals and a manufacturing vessel therefor, and relates more particularly to a method of making high-purity fine particles of reactive metals of IIa, IIIa, IVa and IVb families in the periodic table and a manufacturing vessel therefor, which reactive metals are apt to form hydroxides such as Sr, Ba and Y, that are the elements basic to the making of superconducting materials, and Hf, that is valued for its high hardness and thermal resistance.

2. Background Art

Presently, the need for manufacturing high-purity fine particles of reactive metals, especially those which are liable to form hydroxides, i.e., metals of IIa, IIIa, IVa and IVb families in the periodical table, is mounting because of demands from the advanced materials sector, such as superconducting materials. Here, one technical problem exists in that, since these metals are apt to absorb and retain undesired gases and to become surface oxidized, or in the case of the IIa metals, in particular, to form hydroxide by actively reacting with moisture, as they are pulverized and so increase their surface area, attainment of necessary high purity is very difficult. In fact, it can be said that no satisfactory method has been made available up to the present.

A currently popular method of making superconducting materials, which are compounded oxides of Sr, Ba, Y, La, Cu, and other elements, is to use salts or oxides of these metals as the raw materials. For making Hf materials of high hardness and thermal resistance, on the other hand, carbide of metallic Hf obtained in hydrogen-reducing Hf salts is used.

The problems in these methods are then that, since the raw materials are usually metallic compounds, the reaction system is necessarily more complex than the case of using high-purity fine particles, resulting in lowered purity, hence degradation of desired properties, of the product. When salts are used, in particular, elements and groups that are not of the necessary constituents for the final product are apt to be liberated through dissociation during processing, leaving voids and other crystalline defects behind.

That the reaction system is complex means, moreover, that manufacturing has to be conducted in a multitude of steps, calling for large investment in equipment and high manufacturing costs in mass production.

These difficulties can be eliminated if and when these reactive metals are provided in a finely particulated form, with high purity, and in large quantities. However, as stated earlier, neither a satisfactory method nor an apparatus for production is available today.

SUMMARY OF THE INVENTION

The primary purpose of this invention is to provide a method of manufacturing high-purity fine particles of reactive metals and a manufacturing vessel therefor, the metals being reactive especially in terms of liability to forming hydroxides, namely elements of IIa, IIIa, IVa and IVb families in the periodical table (these metals will be called "reactive metals" hereafter). The method and the vessel of the present invention takes the form of several embodiments.

According to a first embodiment of the present invention, we pulverize any one of the reactive metals in an atmosphere of an inert gas but with its moisture removed to an extremely low concentration, then hermetically store the product particles in a container under the same atmosphere. Here, owing to the protection of the inert gas, absorption and retention of the undesired gas and surface oxidation of the reactive metal are effectively prevented from proceeding even after the metal is pulverized; at the same time, owing to the removal of the moisture to an extremely low level, formation of hydroxides is also prevented; moreover, because of the uninterrupted storing (and hermetically sealing off) of the product in a container under the same atmosphere, maintenance of the attained high purity during shelf storage is ensured.

In a second embodiment, we offer a novel method of removing the moisture from the inert gas, comprising letting the moisture remaining in the inert gas condense into dew droplets on a vessel wall using a cryogenic medium, bringing metallic Na in contact with the dew droplets so as to form sodium hydroxide, dissociating and removing the moisture in the form of hydroxide groups, and finally dissociating and removing still remaining moisture by making it contact with Na vapor generated within the vessel through heating metallic Na. Here, it is to be noted that the action of metallic Na is solid gettering, owing to which the remaining moisture can be reduced to an extremely low level, e.g., 10–100 Weight/Volume part per billion (W/V ppb.).

In a third embodiment, we offer a method for pulverizing any reactive metals of IIa, IIIa, IVa and IVb families in the periodical table. That is to say, even though this invention method is adaptable to the so-called reactive metals in general, the third embodiment is particularly useful for making high-purity fine particles out of the kind of metals which are liable to form hydroxides.

In a fourth embodiment, we conduct mechanical pulverization of the reactive metal after it has lost its ductility upon cooling to a cryogenic temperature. This results in the prevention of purity degradation and in reducing the size of the apparatus.

A first embodiment of the manufacturing vessel is a hermetically sealable vessel, which is equipped with a pair (or a number of pairs) of rubber gloves of the type that allow an operator standing outside the vessel to freely manipulate objects placed under an inert gas atmosphere inside the vessel, namely, those that are often employed in a so-called "glove box," and which is further equipped with a device for cryogenically cooling the moisture into dew droplets at a vessel inner wall and an accumulator which functions to equalize the vessel's internal pressure to the ambient atmospheric pressure.

Here, the dew droplets formed on an inner wall of the vessel are removed by means of a trapping technique, for which we have separately filed a patent application with Japanese Patent Office entitled "Method of Removing Moisture Remaining in an Atmosphere Gas" (Japanese Patent Application No. 63-192037 filed Aug. 2, 1988), the entire disclosure of which is incorporated by reference herein. In this application, metallic Na is employed as the solid getter agent to absorb the moisture in the form of sodium hydroxide.

However, some moisture still remains in the atmosphere since the entire moisture does not condense. In this regard, we remove that part of moisture which remains, though now in a trace amount, with an apparatus which we disclosed in a separate patent application entitled "Apparatus for Generating Sodium Vapor" (Japanese Patent Application No. 63-192038 field Aug. 2, 1988), the entire disclosure of which is incorporated by reference herein. Essentially, this is to conduct the gas phase gettering with Na vapor which is generated through heating metallic Na within the vessel so as to form sodium hydroxide. By this means, an extremely low level of remaining moisture content, e.g., from 10 to 100 W/V ppb, can be attained.

We conduct pulverization of reactive metals under an inert gas atmosphere, now freed of moisture, by means of a mill pulverization method based on the metal being in a state of decreased ductility. Then we collect and hermetically seal the product particles in a container under the same atmosphere. In performing these operations in series using the pair of gloves, an accumulator that equalizes the vessel's internal pressure with the outside ambient atmospheric pressure ensures safety.

In a second embodiment of the manufacturing vessel, a manufacturing vessel is provided that is equipped with a plurality of glove boxes mutually connected in series. As a result of this construction, the series of operations can be performed by an individual stage, each stage in an appropriate box, but in line as a whole.

In a third embodiment, we provide a covering door over each glove opening and a device to equalize the pressure in the space made by the covering door and glove with the internal pressure of the vessel. Due to this construction, the pressure in the space made by the covering door and glove is held always equal to that inside the vessel even when the latter is evacuated or filled with an inert gas, thus preventing the gloves from getting damaged as the atmospheric conditions of the manufacturing vessel are altered.

Summarizing the foregoing, the present invention provides a method of making high-purity fine particles of reactive metals that are liable to form hydroxides, i.e., the metals of IIa, IIIa, IVa and IVb families in the periodical table, in four embodiments, and three embodiments of a vessel for making such particles in which particularly the second embodiment provides for the feasibility of performing operations in line but an independent operation in each box, and the third embodiment features freely changing vessel atmosphere without damaging the rubber gloves.

BRIEF DESCRIPTION OF THE DRAWINGS

FIGS. 10A and 10B show in combination a flowchart of the method of manufacturing high-purity fine particles of reactive metals according to the present invention.

DESCRIPTION OF THE PREFERRED EMBODIMENTS

Figure 1:
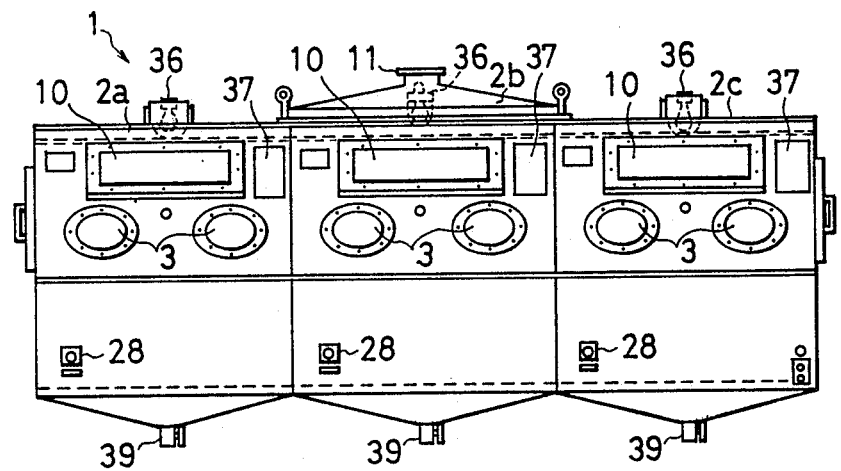
FIG. 1 is a front view of a manufacturing vessel of high-purity fine particles of reactive metals in an embodiment of this invention.
Figure 2:
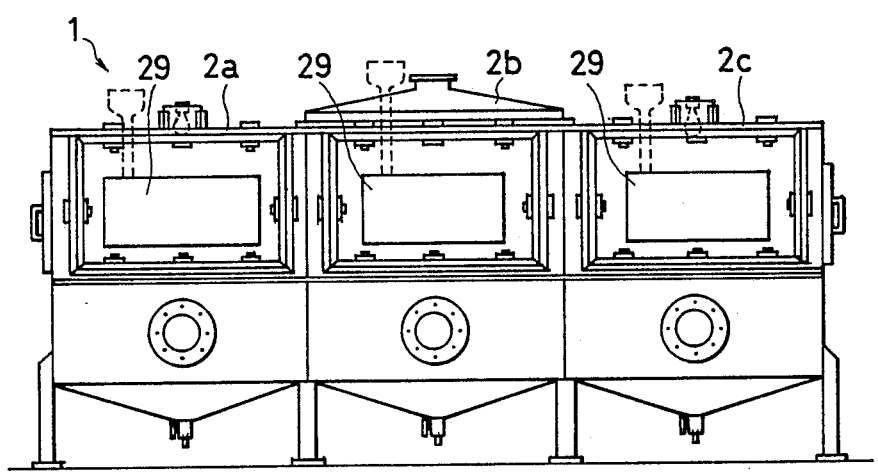
FIG. 2 is a rear view of FIG. 1.
Figure 3:
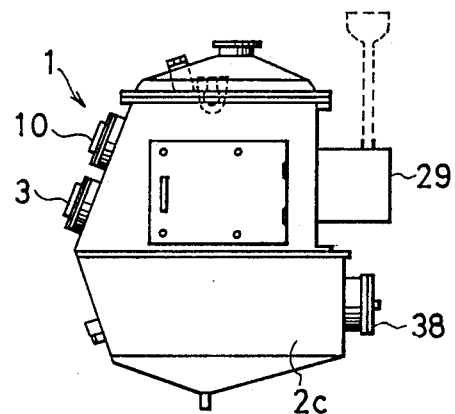
FIG. 3 is a right side view of FIG. 1.
Figure 7:
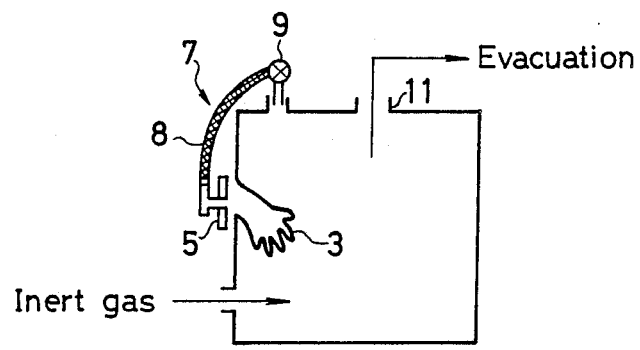
FIG. 7 schematically illustrates a rubber glove, a covering door, and a device for equalizing the pressure.
Figure 8:
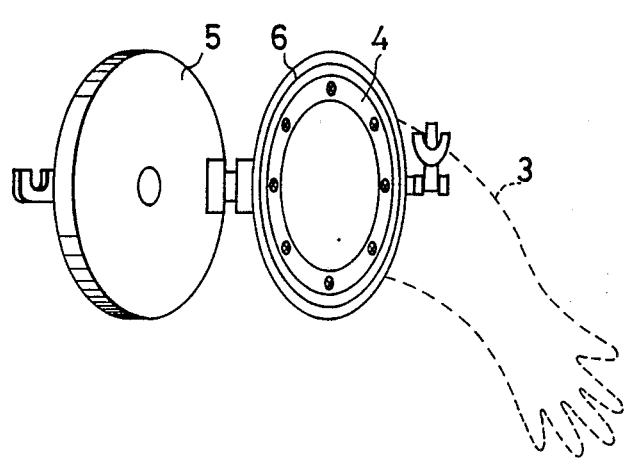
FIG. 8 is a schematic view showing a rubber glove and a covering door.
Figure 9:
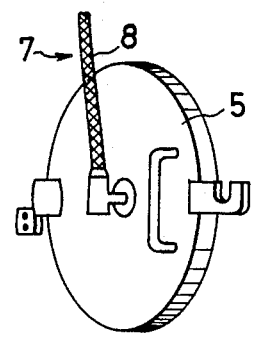
FIG. 9 schematically illustrates a covering door and pressure equalizing device.

In disclosing the present invention in terms of preferred embodiments, and referring to the attached drawings, FIGS. 1 to 3 present a vessel 1 for manufacturing high-purity fine particles of reactive metals in the form of one embodiment of this invention. Here, the vessel 1 comprises three hermetically sealable vessels 2a, 2b and 2c, connected in series. In the front face of each vessel 2a, 2b, and 2c, there is provided a pair of rubber gloves 3, every one of which is hermetically attached to the vessel through a guide ring 4, as shown in FIGS. 7 and 8, so that the operator may perform operations freely within the vessel without affecting the inert gas atmosphere inside the vessel.

A covering door 5 is pivotably mounted on the vessel's side wall, so as to close the opening defined by the glove 8. The door 5 fits on an O-ring 6, as shown in FIGS. 7 and 8. To the covering door 5, moreover, there is provided a pressure equalizing device 7, comprising a pressure hose 8, which connects the inner space of the glove 3, now covered with the covering door 5, to the interior of vessels 2a, 2b, or 2c, so as to hold the respective pressures equal, and an electromagnetic valve 9, which is provided at an uptake port of each vessel. Returning to FIG. 1, an observation window 10 is provided above each pair of the glove openings 3, so as to afford free surveillance of the vessel interior.

Figure 5:
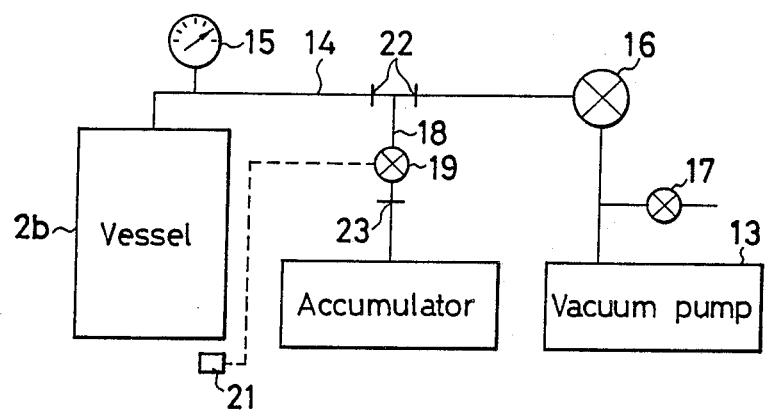
FIG. 5 schematically illustrates the manner of attaching the actuator to the manufacturing vessel of this invention.
Figure 6:
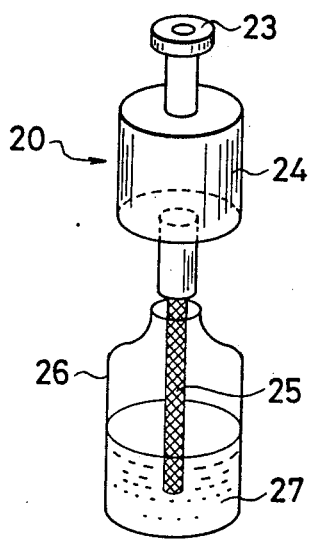
FIG. 6 schematically illustrates the actuator.

As illustrated in FIG. 5, atop the central vessel 2b, there is provided an exhaust nozzle 11, to which a vacuum pump 13 is connected through an evacuation line 14. The evacuation line 14 is provided with a vacuum gauge 15, a main valve 16, and an exhaust valve 17 in that order, and is branched at the flanges 22 between the vacuum gauge 15 and the main valve 16. Each flange 22 possesses an O-ring. The branch or a pressure regulation line 18 is connected to an accumulator 20 at an O-ring flange 23. The pressure regulation line 18 is equipped with an electromagnetic valve 19 which is activated into an open position when the foot pedal 21 is depressed. As shown in FIG. 6, the accumulator 20, which functions to equalize the vessel internal pressure with the ambient atmospheric pressure, includes a backflow absorber 24, ending in a high-pressure mesh vinyl hose 25, a glass bottle 26, and an oil bath (kerosene) 27 with the hose 25 ending within the oil bath 27.

Figure 4:
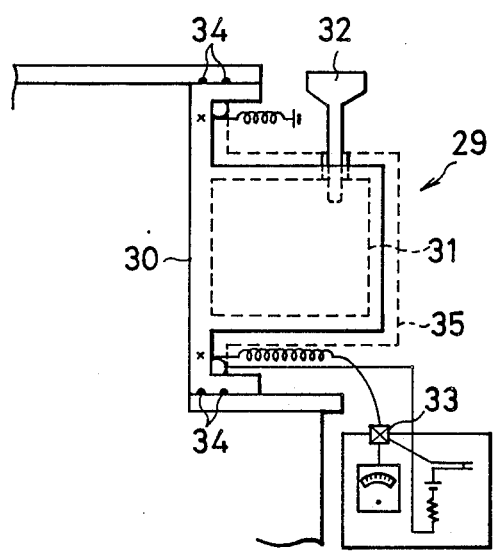
FIG. 4 is a schematic lateral view of the cryogenic cooling device to be equipped to the manufacturing vessel of this invention.

Moreover, each of the vessels 2a, 2b, and 2c is provided with an inert gas inlet port 28 at its front lower part as shown in FIG. 1, and is further provided with a cryogenic dew condenser 29 at its back wall as shown in FIG. 2. Referring to FIG. 4, the cryogenic dew condenser 29 includes a dew condensing plate 30 that forms a part of the vessel's back wall, a cryogenic cooling box 31 that contains the cryogenic cooling medium so as to cool the dew condensing plate 30, a funnel-shaped pouring port 32 through which the cryogenic cooling medium is supplied into the cooling box 31, and an automatic temperature controller 33 that regulates the cooling temperature, e.g., by means of a heat pipe, where the dew condensing plate 30 is integrally attached to the vessel's back wall by means of a double seal 34. Here, both the dew condensing plate 30 and the cooling box 31 (box 31 being integrally formed with the plate 30) are made from copper and are covered with a thermal insulator 35.

Returning to FIG. 1, the vessels 2a, 2b, and 2c are respectively provided with lamps 36 at their ceilings and are further equipped with an operation panel 37 on the front face, a power inlet terminal 38 at its back face (FIG. 3), and a drain port 39 at its bottom.

Turning now to the inventive method of making high-purity fine particles of a reactive metal using such a manufacturing vessel as described hereinabove as the vessel 1, first we wish to make it known that all of the operations are conducted manually and within the confines of the vessel 1, and second, when Sr, Ba, Y, La, Zr, and others are referred to herein, which are raw materials for superconducting materials, or Hf, which is a raw material for superhigh hardness alloys and superalloys, such reference is merely to illustrate examples of reactive metals that are liable to form hydroxides, i.e., the IIa, IIIa, IVa and IVb family metals.

Figure 10A:
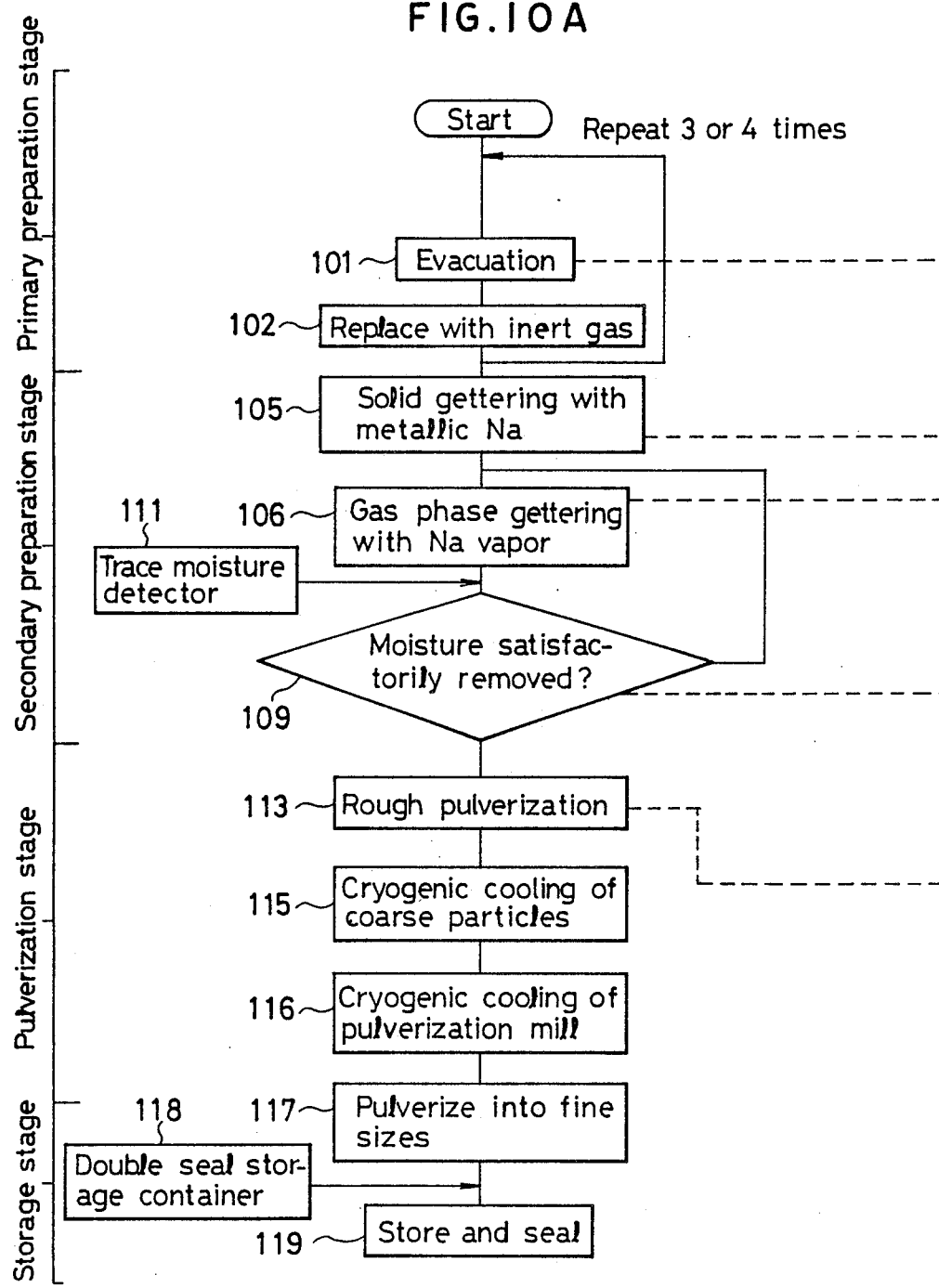

As shown in FIGS. 10A and 10B, the method according to this invention comprises a primary preparation stage, a secondary preparation stage, a pulverization stage, and a product storage stage. In the primary preparation stage, we completely replace the inner atmosphere of the vessel 1 with an inert gas. For this, we evacuate the vessels 2a, 2b, and 2c (step 101) with a vacuum pump 13 through the evacuation line 14 by operating the main valve 16 and the exhaust valve 17 appropriately. After the evacuation, the inert gas is supplied to the vessels 2a, 2b and 2c through the inert gas inlet port 28 (step 102).

This evacuation (step 101) plus replacement (step 102) operation is repeated three or four times, during which we make use of the accumulator 20 of the pressure regulation line 18 so as to maintain the inert gas pressure of the vessel inner atmosphere the same as the ambient atmospheric pressure by appropriately activating the electromagnetic valve 19 with the foot pedal 22.

During these evacuations (step 101), replacement (step 102), and pressure equalization operations, we take care to keep the situations inside the vessels 2a, 2b, and 2c under close observation through respective observation windows 10, to keep the covering doors 5 closed over the glove openings 3, and to activate the respective pressure equalizing devices 7 of the doors 5 so as to protect the gloves 3 by holding the pressure in the space by the gloves and doors 5 the same as that in the vessels 2a, 2b, and 2c.

The gloves 3 allow the operator to insert his hands into the vessels without affecting the sealing of the vessels.

Now, even though the interior of the vessel 1 has been completely filled with an inert gas, there inevitably remains a certain trace amount of moisture in it. In the second preparation stage, we remove this moisture to an extremely low content level. We do this by means of a novel moisture trapping technique (step 107), which we have disclosed in a separate patent application filed in Japan (Japanese Patent Application No. 63-183672 filed July 25, 1988), the entire disclosure of which is incorporated herein by reference. Essentially, this is done by the solid gettering method. Namely, we supply a cryogenic cooling medium to each of the dew condensers 29 provided in the vessels 2a, 2b, and 2c through their pouring ports 32. With liquefied nitrogen used for the cryogenic cooling medium, for example, the dew condensing plates 30 are cooled to −150 degrees C (°C.) or even below, whereupon the moisture remaining in the atmosphere gas is condensed into dew droplets (practically forming ice-flakes) on the walls of the vessels 2a, 2b and 2c.

Subsequently, we bring a piece of rod-shaped metallic Na lumps (which we keep inside the vessels 2a, 2b, and 2c immersed in an oil bath, for example, of petroleum, so as to prevent them from being ignited by atmospheric air) into contact with the condensed dew droplets, whereupon the metallic Na, now protected by the inert gas atmosphere of the vessels 2a, 2b, and 2c from being ignited, reacts with the dew droplets ($H_2O$) in a reaction known as a solid phase getter:

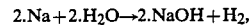

by which the moisture is dissociated into sodium hydroxide (NaOH) and is trapped away as a hydroxide group (step 105).

Even then, however, some moisture still inevitably persists in the atmosphere because the solid getter deals only with condensed moisture. For this, we make use of the above-mentioned apparatus (Na vapor generator) 108, which is disclosed in a patent application we have filed in Japan (Japanese Patent Application No. 63-192038 filed Aug. 2, 1988), the entire disclosure of which is incorporated by reference herein. Essentially, the apparatus 108 allows us to take out a piece of metallic Na from its storage (in an oil bath as in the foregoing case of solid gettering) and to heat it to about 600° C. to melt and evaporate within vessels 2a, 2b, and 2c under protection of their inert gas atmosphere. The Na vapor thus generated fills up the interior of vessel 1 to react with the moisture present in the vessel atmosphere in a reaction known as gas phase getter:

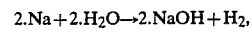

whereby the remaining moisture is reduced (step 106) to an extremely low content level, e.g., between 10 and 100 W/V ppb.

Now we have to confirm whether the moisture has been actually reduced to the extremely low level content as mentioned above. Since there has been no simple method available for the confirmation, we have devised a method and a detector on our own, which are disclosed in Japanese Patent Application No. 63-183672 filed July 25, 1988, the entire disclosure of which is incorporated by reference herein. Essentially, this method (step 110) utilizes a phenomenon wherein, when a dark barium powder comes in contact with moisture, it becomes bleached. The detector 111 includes a transparent cylinder to permit free observation of the content's color with an appropriate quantity of dark barium powder being placed in the transparent cylinder, a pair of gas-permeable stoppers that hold the dark barium powder within the cylinder while allowing the atmosphere gas to come in contact with the barium powder, and a pair of removable covers provided at either end of the transparent cylinder and fixed thereto with a sealant to prevent untimely intrusion of the atmosphere gas.

Dark barium powder functions as a moisture indicator 112. We repeat the gas phase gettering operation until the remaining moisture content has been confirmed to reach the desired level (step 109), e.g., between 10 and 100 W/V ppb.

It is then that we transit into the pulverization stage. Here, we start from rough pulverization (step 113) of the reactive metal lumps, then we immerse the coarsest particles thusly produced in a cryogenic cooling medium, such as liquefied nitrogen, so as to cool them to a temperature of −150° C. or even lower (step (115) and to decrease their ductility at the same time. Concurrently or subsequently, we prepare a pulverization mill, which may be a vibration rod mill or a ball mill, for mechanical pulverization operation by cooling it, especially its vibrator or balls, as the case may be, to a cryogenic temperature, say −150° C. or lower (step 116). Then, we pulverize the coarse reactive metal particles in the mill thusly prepared to fine particles (step 117), e.g., 5 micrometers or even smaller in size.

It is to be appreciated here that, even though other methods are available, the use of a mill in the manner described above ensures maintenance of high purity and makes the apparatus compact as a whole.

Here, for rough pulverization (step 113) of Hf crystal bars, in particular, we prefer the use of the apparatus (step 114) which we disclose in Japanese Patent Application No. 63-238989 filed Sept. 26, 1988 entitled "Method of Roughly Pulverizing Hf Crystal Bars and Apparatus Therefor," the entire disclosure of which is incorporated by reference herein.

In the storage stage, we take special care to prevent the fine particles of reactive metals from absorbing and retaining unnecessary gases on their surfaces, getting oxidized at surfaces, and forming hydroxides, namely, reactions that are apt to take place more progressively as pulverization proceeds, which would otherwise degrade the purity. This is achieved by collecting the product particles in a storage container 118 under the same inert gas atmosphere with its moisture eliminated to an extremely low-level content and sealing the container immediately (step 119). The storage container 118 is preferably of a double-seal construction so as to ensure perfect hermeticity against contamination by oxygen and moisture of the environmental air.

Having disclosed in detail the principles of the present invention, we emphasize again that the vessel 1 does not have to be comprised of three glove boxes mutually connected in series; namely, all the four stages of manufacturing can be performed in a single vessel, or, alternatively, each stage can be assigned to a different and independent vessel of a four-vessel hermetic train. Moreover, a fine particle manufacturing hermetic vessel such as described above can be a module in a group of various work modules, such as raw materials preparation modules, materials pulverization modules, conveyor modules (that take care of transfer of semi-products, products, pulverization mills and such), powder mixing modules, powder metallurgical press forming modules, sintering furnace modules, weighing and packing modules and the like, to be put to service in an appropriate combination with any other modules.

Next, in discussing the effects of the present invention, we note two requisites of prime importance for making high-purity fine particles of reactive metals, reactive especially in terms of their likelihood of forming hydroxides of IIa, IIIa, IVa and IVb families in the periodical table: one is that the atmosphere to which these metals are exposed should be free of oxygen and moisture to forestall surface absorption and retention of undesired gases and to prevent the surface oxidation, both phenomena proceeding progressively and intensely as the metals increase their surface area, and the other is that the working temperature should be cryogenic both for the prevention of impurity-forming reactions and for raising the pulverization efficiency resulting from a decrease of metallic ductility.

These we satisfy by following an elaborate procedure (steps 101 and 102) in establishing an inert gas atmosphere within the manufacturing vessel 1, by performing the solid gettering and, if needed, the gas phase gettering with metallic Na, to achieve an extremely low level of moisture content, e.g., 10 to 100 W/V ppb, by devising a novel method of confirming the atmosphere's having attained this level, by conducting pulverization operations at a cryogenic temperature, e.g., −150° C. or even lower, and by collecting and sealing the product particles in a double-seal container under the same atmosphere.

To reiterate, of particular importance is the secondary preparation stage wherein we achieve an extremely low level of moisture content, e.g., between 10 and 100 W/V ppb. Here, we provide a cryogenic dew condenser 29 with the vessel 1 (comprising vessels 2a, 2b, and 2c in the embodiment described earlier) and let the moisture in the inert gas atmosphere condense into dew droplets on inner walls of the vessel 1; on these dew droplets we perform the solid gettering by bringing a piece of metallic Na in contact with them, resulting in dissociation and removal of moisture as a hydroxide group (step 105); subsequently, we remove the moisture still in the atmosphere by performing the gas phase gettering through generating Na vapor with a Na vapor generator 108 in the vessel 1, again resulting in dissociation and removal of moisture as a hydroxide group (step 105) and attaining the extremely low-level moisture content, e.g., between 10 and 100 W/V ppb.

Owing to the nature of these gettering actions, there is no risk that the moisture will return, even if the temperature or pressure of the atmosphere is changed.

Finally, to evaluate the high-purity fine particles of reactive metals of IIa, IIIa, IVa and IVb families made through this inventive method, we note that direct general comparison is not possible, simply because there are no products of comparable nature commercially available today. Yet for Hf, which is a popular element as HfC (in some cases as metallic Hf) for a raw material of hard alloys and superalloys, however, a comparative assessment has been made or deduced; based on this assessment, the product of this invention possesses the following features:

(1) Applications to superconducting materials

Because the product of this invention is not a compound but a high-purity metal, it can be processed through much simpler reaction systems into desired complex metallic oxides, which finish with atomic structures of high regularity. Also, the disuse of metallic compounds for the starters results in extremely rare intrusion of impurity atoms or presence of voids in the crystalline structure, because no undesired substances are formed through dissociation during processing. This is reflected by the good reproducibility and stability of quality and performances.

(2) Applications to manufacturing FfC

In comparing HfC with those made from metallic Hf particles produced through hydrogen-reducing a Hf compound, the HfC made from Hf metal produced by this invention method is characterized by markedly higher purity as mentioned above. This means that the Hf metal produced by this invention method is better suited for making complex carbides together with W, Ta, Nb, Mo, Co, and others for the purpose of improving the elastic properties over that of simple HfC.

(3) Other applications

Demands for fine particles of metallic Hf are also on the increase as a raw material for HfC. In this area of development, the method of the present invention will prove to be more advantageous because it enables the construction of a mass production line at less equipment investment than that for modifying the currently popular methods of producing HfC, because the latter are basically a throughput process leading to HfC, or those of producing powder metallic Hf out of sponge Hf, because the metallic Hf they produce inevitably contains impurities such as nitrogen, oxygen, chlorine, and magnesium.

We claim:

1. The method of making high-purity fine particles of reactive metals which are particularly inclined to form hydroxides, comprising the steps of:
   (A) evacuating air from a vessel and establishing an inert gas atmosphere within the vessel in which said particles are to be manufactured;
   (B) reducing the amount of moisture remaining in the inert gas atmosphere established in step (A) within the vessel to an extremely low level;
   (C) pulverizing a reactive metal into said particles within said inert gas atmosphere within the vessel after completing step (B); and
   (D) collecting and sealing said particles of reactive metal in a storage container within the inert gas atmosphere after completing step (D).

2. The method of making high purity fine particles of reactive metals according to claim 1, wherein step (B) is performed by dissociating and removing trace amounts of moisture contained in the inert gas atmosphere by generating Na vapor in the inert gas atmosphere.

3. The method of making high-purity fine particles of reactive metals according to claim 1, wherein step (B) is performed by causing the moisture to condense into dew droplets using a cryogenic cooling medium, dissociating and removing the dew droplets by bringing metallic Na into contact with them, and dissociating and removing any further remaining trace amounts of moisture in the inert gas atmosphere by generating Na vapor in the inert gas atmosphere.

4. The method of making high-purity fine particles of reactive metals according to claim 1, wherein the reactive metals are of the IIa, IIIa, IVa and IVb families of the periodical table.

5. The method of making high-purity fine particles of reactive metals according to claim 1, wherein step (C) is performed by cooling the metal to a cryogenic, temperature thereby decreasing its ductility and then mechanically pulverizing the reactive metal.

6. The method of making high-purity fine particles of reactive metals according to claim 1, wherein said extremely low level of moisture is between 10 and 100 W/V ppb.

7. The method of making high-purity fine particles of reactive metals according to claim 1, wherein step (A) is repeated, thereby successively removing remaining amounts of air from the vessel.

8. The method of making high-purity fine particles of reactive metals according to claim 1, wherein step (A) is performed by evacuating air from a top portion of the vessel and feeding inert gas to a bottom portion of the vessel.

9. The method of making high-purity fine particles of reactive metals according to claim 8, wherein step (B) is performed by first using a cryogenic cooling medium to condense the moisture into dew droplets or ice flakes, and then dissociating and removing the dew droplets or ice flakes by bringing metallic Na into contact with the droplets or flakes.

10. The method of making high-purity fine particles of reactive metals according to claim 8, wherein the reactive metals are of the IIa, IIIa, IVa and IVb families of the periodic table.

11. The method of making high-purity fine particles of reactive metals according to claim 8, wherein step (C) is performed by cooling the metal to a cryogenic, temperature thereby decreasing its ductility and then mechanically pulverizing the reactive metal.

12. The method of making high-purity fine particles of reactive metals according to claim 1, wherein step (B) is performed by first using a cryogenic cooling medium to condense the moisture into dew droplets or ice flakes, and then dissociating and removing the dew droplets or ice flakes by bringing metallic Na into contact with the droplets or flakes.

13. The method of making high-purity fine particles of reactive metals according to claim 1, wherein the inert gas is argon.

14. The method of making high-purity fine particles of reactive metals which are particularly inclined to form hydroxides, comprising the steps of:
   (A) evacuating air from a container in which said particles are to manufactured;
   (B) feeding an inert gas into said container;
   (C) repeating steps (A) and (B), thereby forming an inert gas atmosphere within the container;
   (D) reducing the amount of moisture remaining in the inert gas atmosphere after step (C) to an extremely low level;
   (E) pulverizing a reactive metal into said particles within said inert gas atmosphere after completing step (D); and
   (F) collecting and sealing said particles of reactive metal in a storage container within the inert gas atmosphere after completing step (E).

15. The method of making high-purity fine particles of reactive metals according to claim 14 wherein air in the container is evacuated from the top of the container in step (A), and in step (B) the inert gas is fed to the bottom of the container.

16. The method of making high-purity fine particles of reactive metals according to claim 15, wherein step (D) is performed by first causing the moisture to condense into dew droplets or ice flakes using a cryogenic cooling medium, and then dissociating and removing the dew droplets or ice flakes by bringing metallic Na into contact with the droplets or flakes.

17. The method of making high-purity fine particles of reactive metals according to claim 15, wherein step (D) is performed by dissociating and removing trace amounts of moisture contained in the inert gas atmosphere by generating Na vapor in the inert gas atmosphere.

18. The method of making high-purity fine particles of reactive metals according to claim 15, wherein the inert gas is argon.

19. The method of making high-purity fine particles of reactive metals according to claim 15, wherein the reactive metals are selected from the group consisting of the IIa, IIIa, IVa and IVb families of the periodic table.

20. The method of making high-purity fine particles of reactive metals according to claim 15, wherein step (E) is performed by cooling the metal to a cryogenic temperature, thereby decreasing its ductility and then mechanically pulverizing the reactive metal.

21. The method of making high-purity fine particles of reactive metals according to claim 14, wherein step (D) is performed by first causing the moisture to condense into dew droplets or ice flakes using a cryogenic cooling medium, and then dissociating and removing the dew droplets or ice flakes by bringing metallic Na into contact with the droplets or flakes.

22. The method of making high-purity fine particles of reactive metals according to claim 14, wherein the inert gas is argon.

23. The method of making high-purity fine particles of reactive metals according to claim 14, wherein step (D) is performed by dissociating and removing trace amounts of moisture contained in the inert gas atmosphere by generating Na vapor in the inert gas atmosphere.

24. The method of making high-purity fine particles of reactive metals according to claim 14, wherein the reactive metals are of the IIa, IIIa, IVa and IVb families of the periodic table.

25. The method of making high-purity fine particles of reactive metals according to claim 14, wherein step (E) is performed by cooling the metal to a cryogenic temperature, thereby decreasing its ductility and then mechanically pulverizing the reactive metal.

* * * * *

UNITED STATES PATENT AND TRADEMARK OFFICE
CERTIFICATE OF CORRECTION

PATENT NO. : 4,971,258
DATED : November 20, 1990
INVENTOR(S) : Toru Yamaguchi, Yukio Inazuki, Hideo Nakazawa It is certified that error appears in the above-identified patent and that said Letters Patent is hereby corrected as shown below:

Column 9, line 50, change "periodical" to --periodic--.

Column 9, line 53, after "cryogenic" delete --,--.

Column 9, line 54, before "thereby" insert --,--.

Column 10, line 15, before "thereby" insert --,--.

Signed and Sealed this

Nineteenth Day of May, 1992

Attest:

DOUGLAS B. COMER

*Attesting Officer*     *Acting Commissioner of Patents and Trademarks*